US012668059B2

(12) United States Patent
Yamasaki

(10) Patent No.: US 12,668,059 B2
(45) Date of Patent: Jun. 30, 2026

(54) INKJET RECORDING APPARATUS

(71) Applicant: KYOCERA Document Solutions Inc., Osaka (JP)

(72) Inventor: Shunsuke Yamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 231 days.

(21) Appl. No.: 18/764,103

(22) Filed: Jul. 3, 2024

(65) Prior Publication Data

US 2025/0010616 A1 Jan. 9, 2025

(30) Foreign Application Priority Data

Jul. 6, 2023 (JP) ................................ 2023-111279

(51) Int. Cl.
*B41J 2/165* (2006.01)

(52) U.S. Cl.
CPC ....... *B41J 2/16538* (2013.01); *B41J 2/16544* (2013.01); *B41J 2/16552* (2013.01); *B41J 2/16588* (2013.01); *B41J 2002/16558* (2013.01)

(58) Field of Classification Search
CPC ............... B41J 2/16538; B41J 2/16544; B41J 2/16552; B41J 2/16588; B41J 2002/16558
See application file for complete search history.

(56) References Cited

U.S. PATENT DOCUMENTS

2015/0273836 A1* 10/2015 Akuta ................. B41J 2/16538 347/33
2018/0194141 A1 7/2018 Araki et al.
2019/0366721 A1* 12/2019 Ohkura ............... B41J 2/16535

FOREIGN PATENT DOCUMENTS

JP 2018108711 A 7/2018

* cited by examiner

*Primary Examiner* — Justin Seo
(74) *Attorney, Agent, or Firm* — Studebaker Brackett PLLC

(57) ABSTRACT

An inkjet recording apparatus includes a recording head, a blade, and a cleaning liquid supply member. The head unit is provided with a nozzle surface. The cleaning liquid supply member includes a supply port, a sheet member, and a holder. When the cleaning liquid supply member is moved to a supply position and then the recording head is lowered, a tip end of the sheet member comes into contact with the nozzle surface, and then the cleaning liquid supply member is turned from an inclined posture to a supply posture while the tip end of the sheet member is moved along the nozzle surface forward in the moving direction, and the sheet member is disposed between the supply port and the nozzle surface.

3 Claims, 11 Drawing Sheets

INKJET RECORDING APPARATUS

INCORPORATION BY REFERENCE

This application is based on and claims the benefit of priority from Japanese patent application No. 2023-111279 filed on Jul. 6, 2023 which is incorporated by reference in its entirety.

BACKGROUND

The present disclosure relates to an inkjet recording apparatus including a blade which wipes ink attached to a nozzle surface of a recording head.

The inkjet recording apparatus is provided with a wipe unit which moves a blade along the nozzle surface of the recording head to wipe the ink attached to the nozzle surface. When the blade is moved along the nozzle surface, a cleaning liquid is supplied on the downstream side of a moving start position of the blade. The blade is moved along the nozzle surface while holding the supplied cleaning liquid.

The recording head sometime has a cleaning liquid supply port between the nozzle surface and the moving start position of the blade. When the blade is moved, the cleaning liquid is suppled through the cleaning liquid supply port, and the ink attached to the nozzle surface is wiped off by the blade together with the cleaning liquid.

In the case where a cleaning liquid supply member supplying the cleaning liquid to the supply port is formed integrally with the recording head, the cleaning liquid supplied to the supply port is adjacent to the nozzle surface during printing. Therefore, when the sheet passing under the recording head is bent upward at the time of printing, there is a problem that the sheet comes into contact with the cleaning liquid supply member and the sheet is contaminated with the cleaning liquid or the cleaning liquid supply member is damaged by the sheet.

Therefore, there is a case where the cleaning liquid supply member is not integrally provided with the recording head, but is movably provided at a position adjacent to the nozzle surface and another position separated from the nozzle surface. In this case, the cleaning liquid supply member is provided with a sheet member to close the gap between the cleaning liquid supply member and the recording head. When the cleaning liquid supply member is moved to the position adjacent to the nozzle surface, the sheet member abuts against the nozzle surface from below and is disposed between the nozzle surface and the supply port. Thereafter, when the blade is moved from the moving start position, the blade passes through the supply port and moves along the sheet member to the nozzle surface. Then, a wiping operation in which the blade moves along the nozzle surface is performed. By this wiping operation, the ink remaining on the nozzle surface N is wiped off by the blade together with the cleaning liquid supplied to the supply port.

However, when the sheet member is provided in this manner, the cleaning liquid may enter between the sheet member and the nozzle surface, and the cleaning liquid may be attached to the nozzle surface. Then, a problem such as defective ejection of the ink from the nozzle surface occur.

SUMMARY

An inkjet recording apparatus according to the present disclosure includes a recording head, a blade, and a cleaning liquid supply member. The head unit is provided with a nozzle surface on which a plurality of ink ejection ports is opened downward and supported to be lifted and lowered. The blade is movable along a predetermined moving direction in contact with the nozzle surface to wipe the nozzle surface. The cleaning liquid supply member is movable between a separated position and a supply position. In the separated position, the cleaning liquid supply member is separated from the nozzle surface and capable of being supplied with cleaning liquid. In the supply position, the cleaning liquid supply member is capable of supplying the cleaning liquid to between the nozzle surface and a moving start position of the blade. The cleaning liquid supply member includes a supply port, a sheet member, and a holder. In the supply port, the supplied cleaning liquid is held. The sheet member is provided on a front side of the supply port in the moving direction. The holder supports the sheet member so as to be turned from an inclined posture inclined upward toward the front side in the moving direction to a supply posture extending toward the front side in the moving direction. When the cleaning liquid supply member is moved to the supply position and then the recording head is lowered, a tip end of the sheet member comes into contact with the nozzle surface, and then the cleaning liquid supply member is turned from the inclined posture to the supply posture while the tip end of the sheet member is moved along the nozzle surface forward in the moving direction, and the sheet member is disposed between the supply port and the nozzle surface.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus according to one embodiment of the present disclosure will be described.

Figure 1:
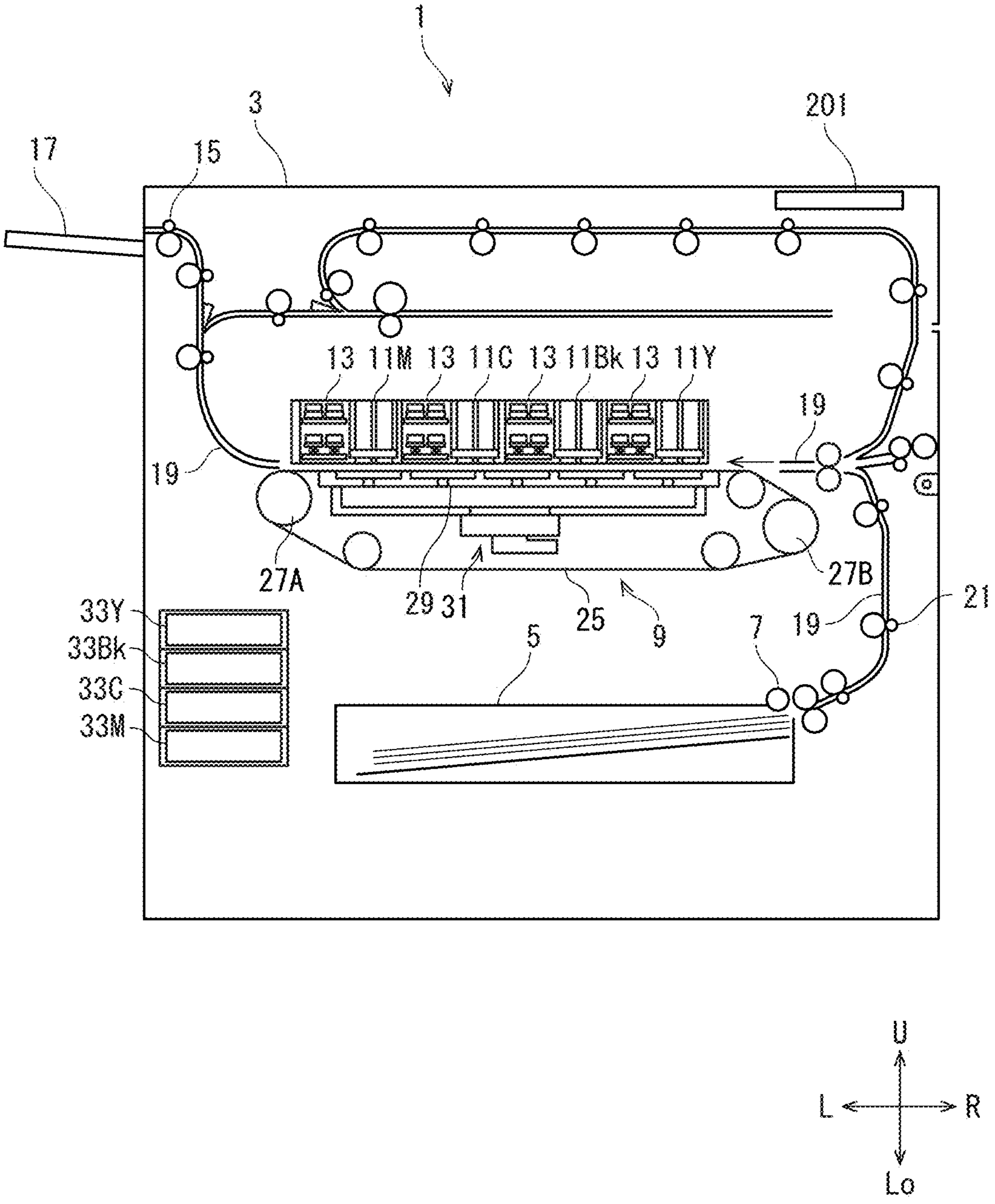
FIG. 1 is a front view schematically showing an inner structure of an inkjet recording apparatus according to one embodiment of the present disclosure.
Figure 2A:
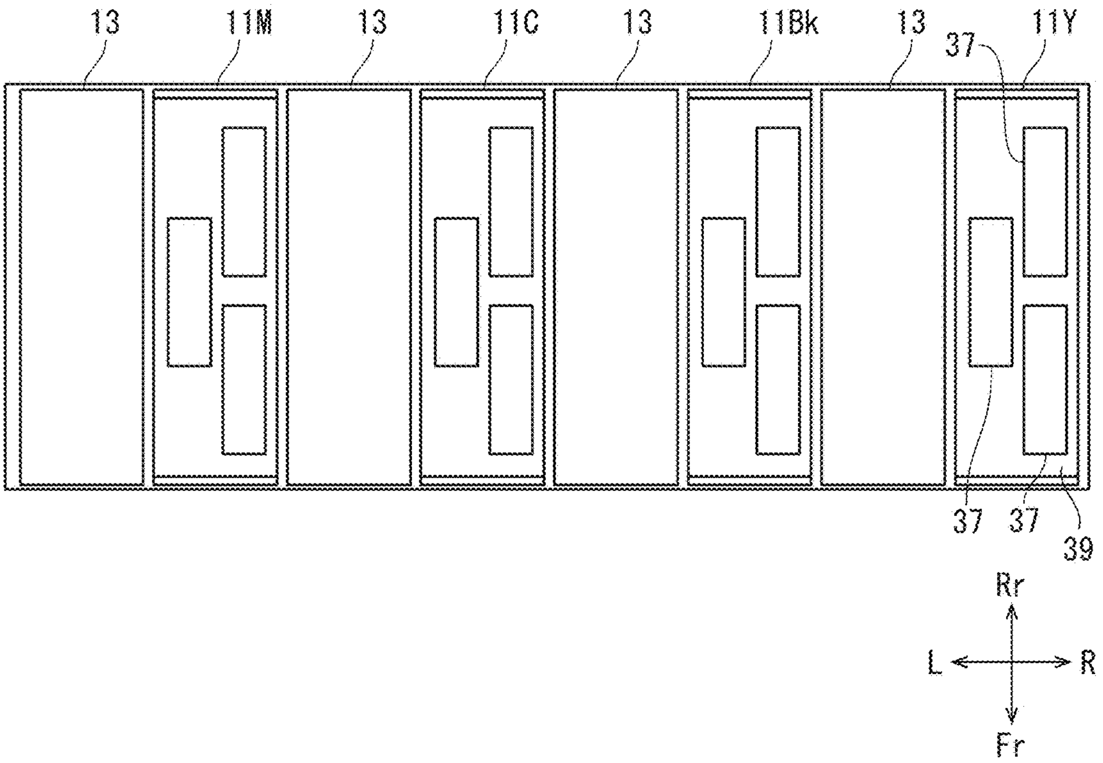
FIG. 2A is a plan view schematically showing head units and maintenance units of the inkjet recording apparatus according to the embodiment of the present disclosure.
Figure 2B:
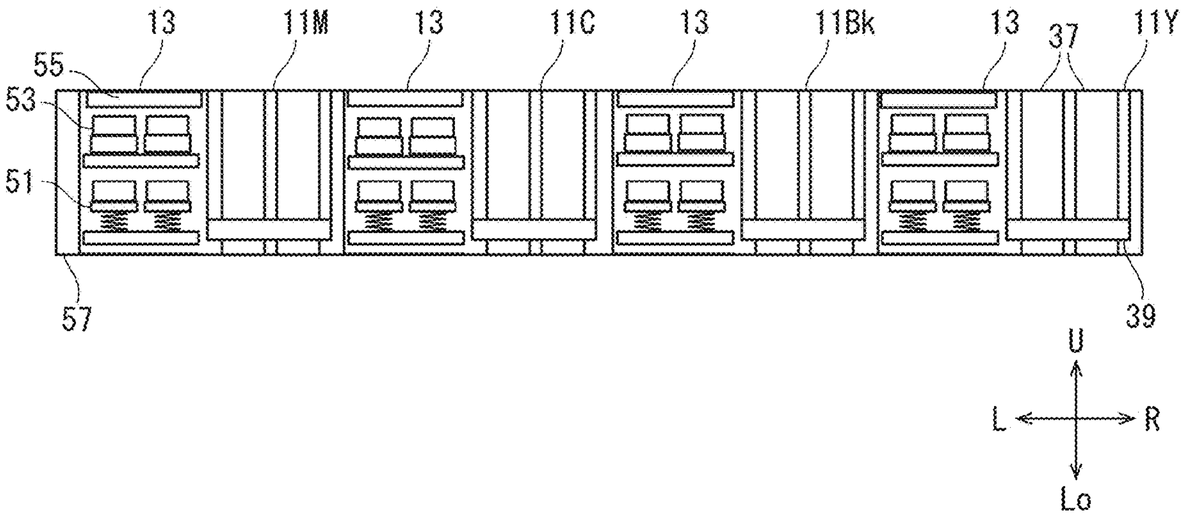
FIG. 2B is a front view schematically showing the head units and the maintenance units of the inkjet recording apparatus according to the embodiment of the present disclosure.

First, the entire configuration of the inkjet recording apparatus 1 will be described with reference to FIG. 1, FIG. 2A, and FIG. 2B. FIG. 1 is a front view schematically showing the inside of the inkjet recording apparatus 1. FIG. 2A is a plan view schematically showing head units 11 and maintenance units 13, and FIG. 2B is a side view schematically showing the head units 11 and the maintenance units 13. Hereinafter, the front side of the paper plane on which FIG. 1 is drawn is defined as the front side of the inkjet recording apparatus 1. In each figure, U, Lo, L, R, Fr, and Rr indicate the upper, lower, left, right, front, and rear, respectively.

As shown in FIG. 1, the inkjet recording apparatus 1 is an inkjet image forming apparatus that forms an image by ejecting ink. The inkjet recording apparatus 1 includes a rectangular parallelepiped body housing 3. In the lower portion of the inside of the body housing 3, a sheet feeding cassette 5 which stores a sheet, such as a plain paper and a coated paper, and a sheet feeding roller 7 which feeds the sheet from the sheet feeding cassette 5 are provided. Above the sheet feeding cassette 5, a conveying unit 9 which conveying the sheet is provided. Above the conveying unit 9, four head units 11M, 11C, 11Bk, and 11Y (collectively referred to as a head unit 11) and four maintenance units 13 are provided (see also FIG. 2A and FIG. 2B). In the left and upper portion of the body housing 3, a discharge rollers pair 15 which discharges the sheet on which an image is formed and a discharge tray 17 on which the discharged sheet is stacked are provided.

Inside the body housing 3, a conveyance path 19 from the sheet feeding cassette 5 through the conveying unit 9 to the discharge rollers pair 15 is provided. On the conveyance path 19, a plurality of conveying rollers pairs 21 for conveying the sheet is provided.

Next, the conveying unit 9 will be described with reference to FIG. 1. The conveying unit 9 includes an endless conveying belt 25. The conveying belt 25 has a number of through-holes penetrating in the thickness direction. The conveying belt 25 is wound around a driving roller 27A and a driven roller 27B arranged at an interval in the left-and-right direction. The driving roller 27A is driven by a motor (not shown) to be rotated. As the driving roller 27A is rotated, the conveying belt 25 travels in the counterclockwise direction of FIG. 1. The conveying belt 25 traveling along an upper track forms the conveyance path 19 along which the sheet is conveyed in a conveyance direction from the right to the left in FIG. 1.

In the inner hollow space of the conveying belt 25, a conveying plate 29 and a suction device 31 are provided. The conveying plate 29 has a number of through-holes penetrating in the thickness direction. The conveying plate 29 is in contact with the inner surface of the conveying belt 25 traveling along the upper track. The suction device 31 is provided below the conveying plate 29, and attracts the sheet to the conveying belt 25 by sucking air through the through-holes of the conveying belt 25 and the through-holes of the conveying plate 29.

Next, the head unit 11 will be described. The four head units 11Y, 11Bk, 11C, and 11M correspond to yellow, black, cyan, and magenta inks, respectively, and are arranged above the conveying unit 9 at predetermined intervals along the conveyance direction. Ink containers 33Y, 33Bk, 33C, and 33M filled with the yellow, black, cyan, and magenta ink, respectively, are connected to the four head units 11. As shown in FIG. 2A and FIG. 2B, the head unit 11 includes three recording heads 37 and a plate 39 for supporting the three recording heads 37.

Figure 3A:
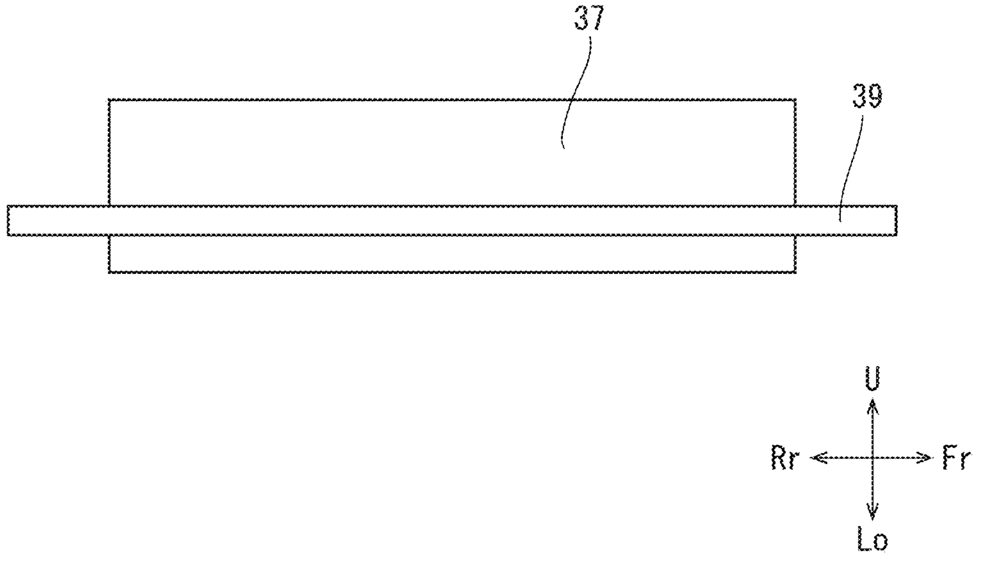
FIG. 3A is a side view showing a recording head of the inkjet recording apparatus according to the embodiment of the present disclosure.
Figure 3B:
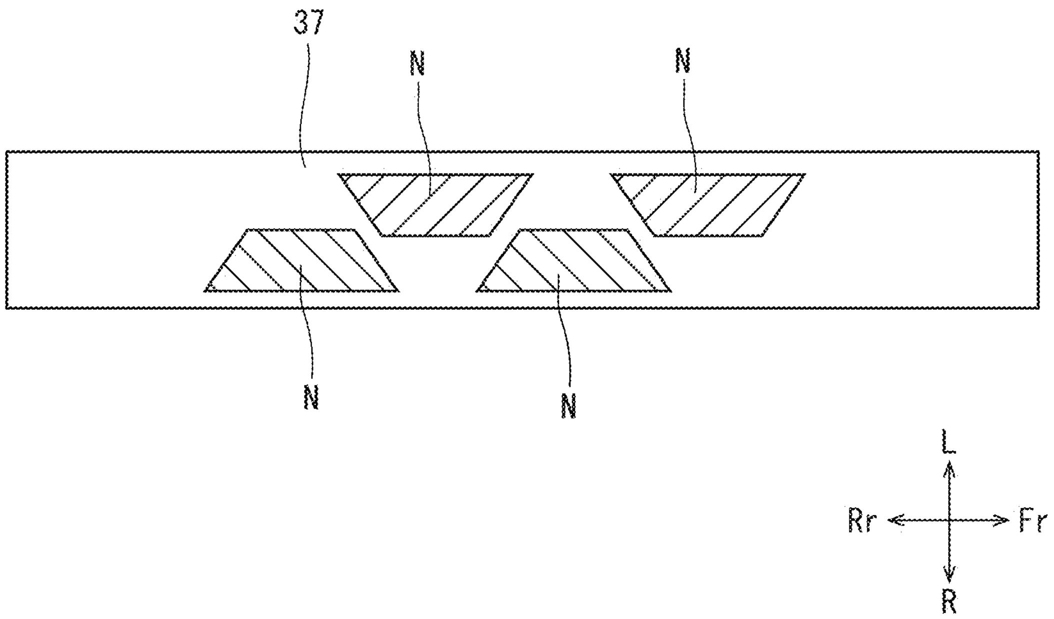
FIG. 3B is a bottom view showing the recording head of the inkjet recording apparatus according to the embodiment of the present disclosure.

The recording head 37 will be described with reference to FIG. 3A and FIG. 3B. FIG. 3A is a side view showing the recording head 37, and FIG. 3B is a bottom view showing the recording head 37. The recording head 37 has a rectangular parallelepiped shape elongated in a width direction (the front-and-rear direction) intersecting the sheet conveyance direction. The recording head 37 includes a number of nozzles (not shown) to which the ink is supplied, and a piezoelectric element (not shown) provided for each nozzle. The ejection ports of the nozzles are opened on the lower surface of the recording head 37. When the piezoelectric element is driven, the ink in the nozzle is ejected downward through the ejection port. As shown in FIG. 3B, the surface including the region N where the ejection ports are opened is defined as a nozzle surface N.

As shown in FIG. 2A, the three recording heads 37 are arranged in a staggered pattern along the width direction (the front-and-rear direction). Specifically, the two recording heads 37 are arranged side by side in the width direction, and one recording head 37 is arranged adjacent to the two recording heads 37 in the conveyance direction (the left-and-right direction). The recording head 37 is supported such that the lower end portion protrudes from the plate 39 as shown in FIG. 3A.

Each of the four head units 11 is supported by a head unit lifting mechanism 41 (see FIG. 10) so as to be lifted and lowered between a printing position and a retracted position. The printing position is a position where the nozzle surface N of the recording head 37 of the head unit 11 faces the conveying belt 25 traveling along the upper track with a predetermined interval (for example, 1 mm) (see FIG. 1). The retracted position is a position where the nozzle surface N of the recording head 37 of the head unit 11 is separated from the conveying belt 25 higher than the printing position to form a space above the conveying unit 9 in order to accommodate a cap unit 51 and a wipe unit 53 of the maintenance unit 13 described later. The head unit lifting mechanism 41 is electrically connected to the control part 201 (see FIG. 10).

Next, the maintenance unit 13 will be described. The four maintenance units 13 have the same structure, and are provided for the respective four head units 11. The maintenance unit 13 is disposed adjacent to the corresponding head unit 11 in the conveyance direction. In this embodiment, the maintenance unit 13 is disposed on a downstream side (the left side) of the corresponding head unit 11.

As shown in FIG. 2B, the maintenance unit 13 includes the cap unit 51 that covers the nozzle surfaces N of the three recording heads 37 of the head unit 11, a wipe unit 53 that cleans the nozzle surfaces N of the three recording heads 37 of the head unit 11, and a cleaning liquid supply part 55 that supplies cleaning liquid to the wipe unit 53.

The cap unit 51, the wipe unit 53, and the cleaning liquid supply part 55 are supported by a housing 57. The housing 57 is disposed on the downstream side (the left side) of the corresponding head unit 11. The housing 57 has a hollow rectangular parallelepiped shape elongated in the width direction, and a surface (the right surface) facing the corresponding head unit 11 is opened.

Figure 4:
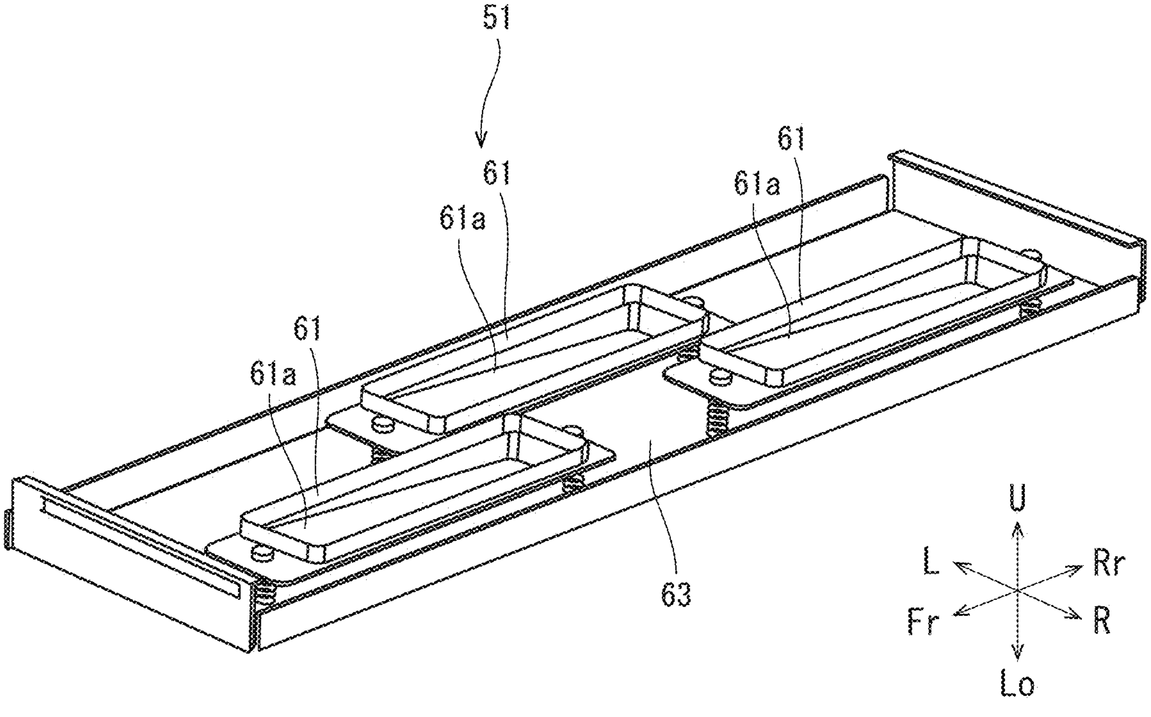
FIG. 4 is a perspective view showing a cap unit of the inkjet recording apparatus according to one embodiment of the present disclosure.

First, the cap unit 51 will be described with reference to FIG. 4. FIG. 4 is a perspective view showing the cap unit 51. The cap unit 51 includes three caps 61 covering the nozzle surfaces N of the three recording heads 37. The three caps 61 are arranged in a staggered pattern along the width direction to correspond to the three recording heads 37 of the head unit 11, and are supported by a support plate 63. The cap 61 has a recess 61*a* having an open upper surface, and a discharge port (not shown) provided at the bottom of the recess 61*a*.

The cap unit 51 can be moved between a standby position (see FIG. 1, FIG. 2A, and FIG. 2B) and a capping position in the conveyance direction and in the opposite direction (the left-and-right direction) by a cap unit moving mechanism (not shown). The standby position is a position where the cap unit 51 is accommodated in the lower space of the housing 57. The capping position is a position where the cap unit 51 is accommodated in the space below the head unit 11 lifted to the retracted position. By moving the cap unit 51 to the capping position and lowering the head unit 11 to a predetermined height, the nozzle surfaces N of the three recording heads 37 are covered with the three caps 61. The cap unit 51 is movable between the capping position and the standby position through the right opened surface of the housing 57.

Figure 5:
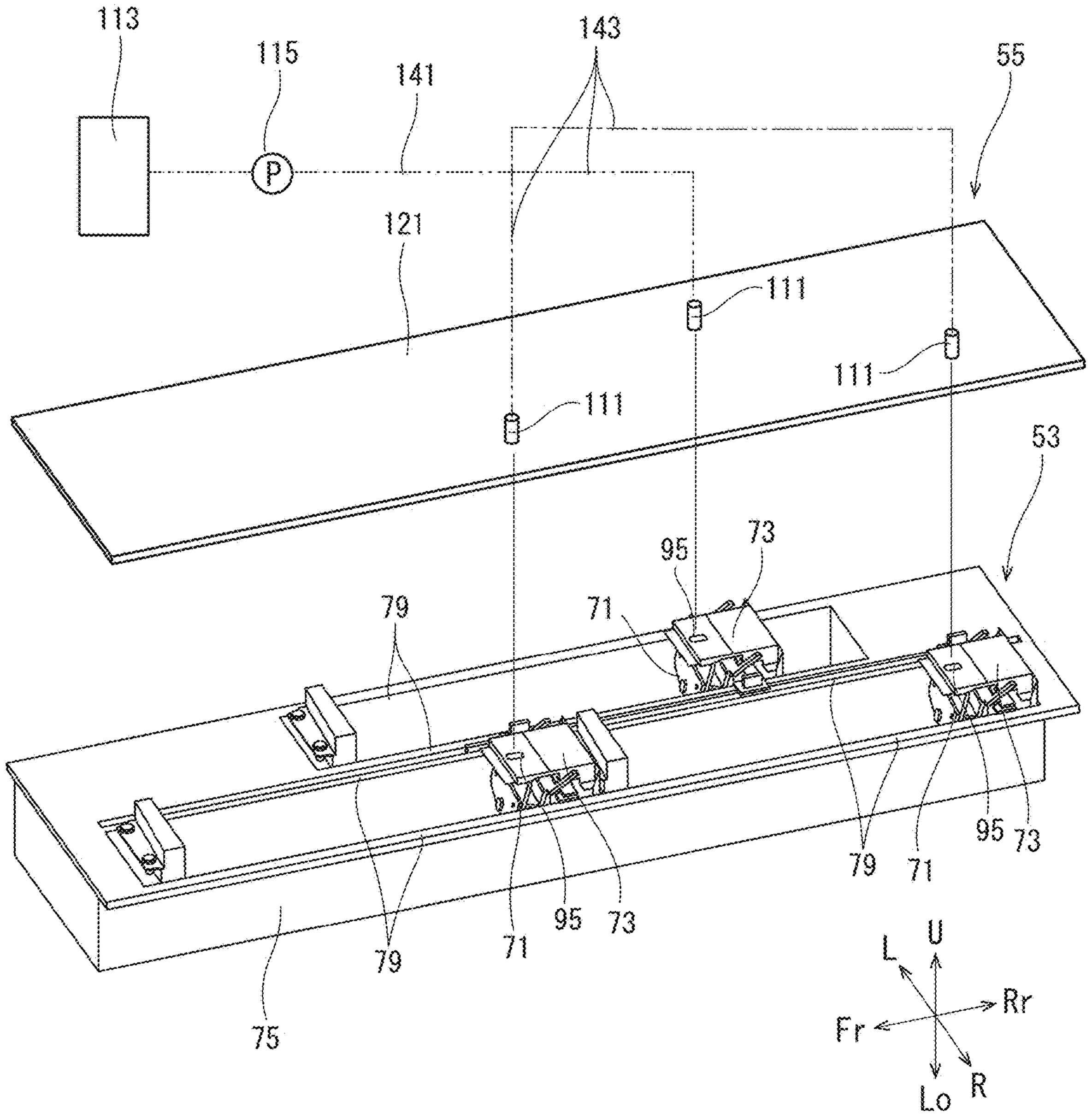
FIG. 5 is a perspective view showing a wipe unit and a cleaning liquid supplying mechanism, in the inkjet recording apparatus according to the embodiment of the present disclosure.

Next, the wipe unit 53 will be described with reference to FIG. 5. The wipe unit 53 includes three carriages 71, three cleaning liquid supply members 73, and a waste liquid tray 75 by which the three carriages 71 and the three cleaning liquid supply members 73 are supported.

First, the waste liquid tray 75 will be described. The waste liquid tray 75 is a tray whose upper surface is opened, and has a dimension corresponding to the head unit 11. The waste liquid tray 75 is provided with three rails 79 along the width direction (the front-and-rear direction). The three rails 79 are arranged in a staggered manner along the width direction in the same manner as the three recording heads 37 of the head unit 11.

Figure 6A:
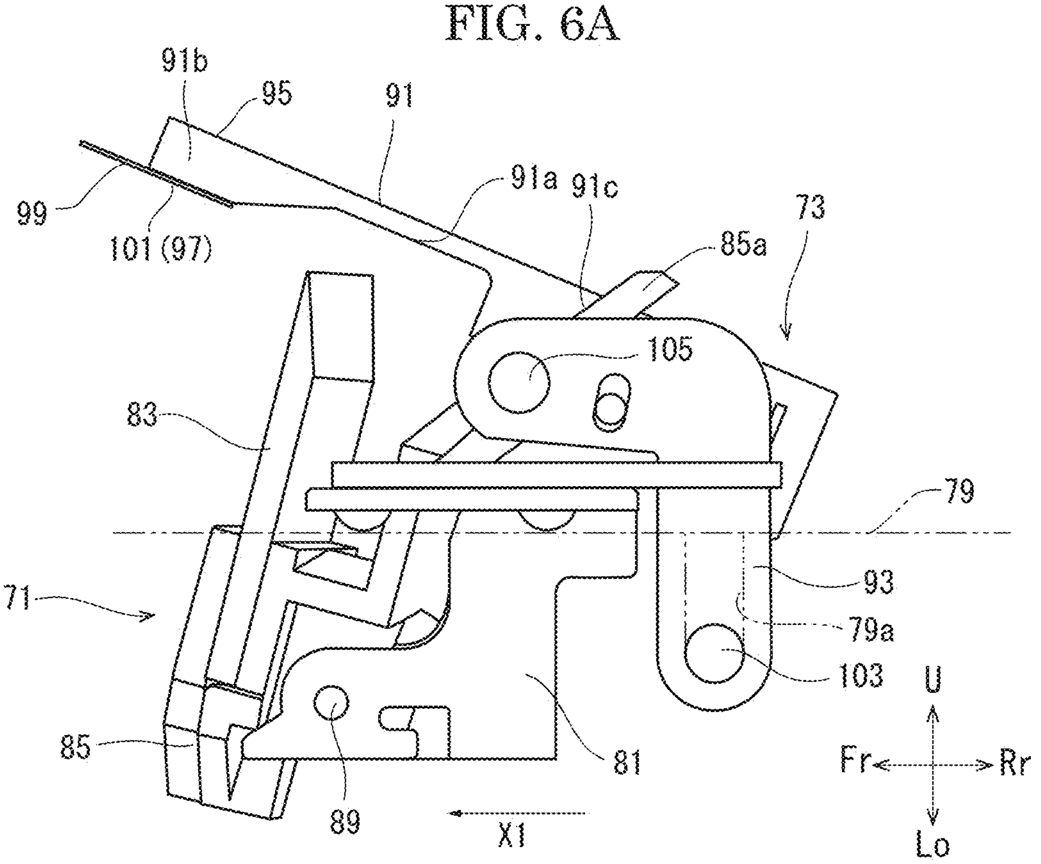
FIG. 6A is a sectional view showing a carriage and a cleaning liquid supply member (in a state where a cleaning liquid storage member is turned to an inclined posture), in the inkjet recording apparatus according to the embodiment of the present disclosure.
Figure 6B:
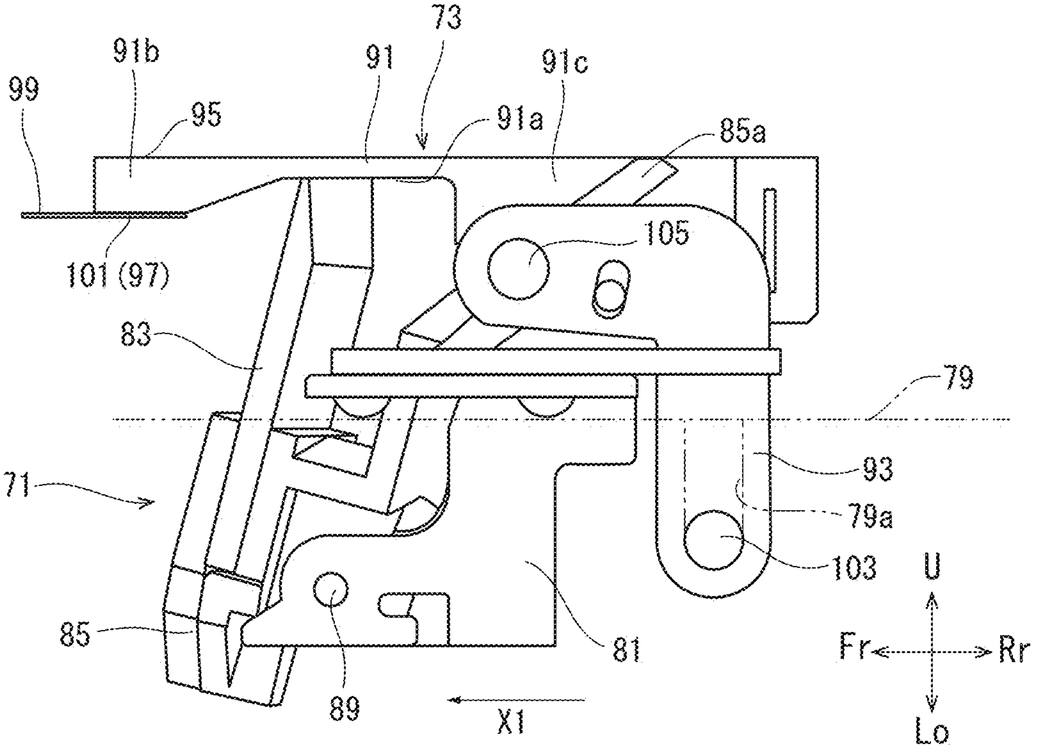
FIG. 6B is a sectional view showing the carriage and the cleaning liquid supply member (in a state where the cleaning liquid storage member is turned to a supply posture), in the inkjet recording apparatus according to the embodiment of the present disclosure.
Figure 7:
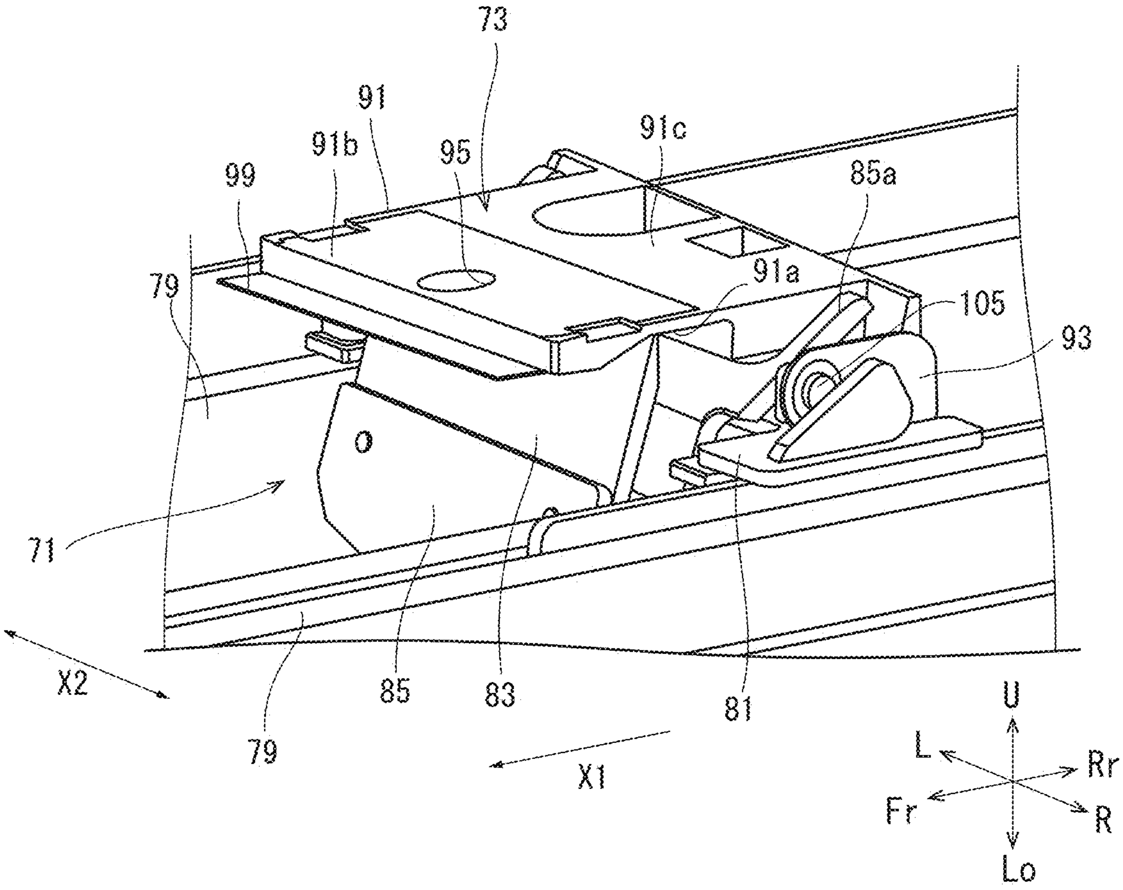
FIG. 7 is a perspective view showing the carriage and the cleaning liquid supply member, in the inkjet recording apparatus according to the embodiment of the present disclosure.

Next, the carriage 71 and the cleaning liquid supply member 73 will be described with reference to FIG. 6A, FIG. 6B, and FIG. 7. FIG. 6A and FIG. 6B are sectional views showing the carriage 71 and the cleaning liquid supply member 73, and FIG. 7 is a perspective view showing the carriage 71 and the cleaning liquid supply member 73. FIG. 7 shows a state in which the cleaning liquid storage member 91 is turned to an inclined posture.

First, the carriage 71 will be described. The carriage 71 has a moving body 81, a blade 83, and a holder 85 that supports the blade 83 and is supported by the moving body 81. The moving body 81 is engaged with the rail 79 provided in the waste liquid tray 75, and can be moved between a moving start position and a moving end position along the rail 79 by a carriage moving mechanism 87 (not shown in FIG. 6A, FIG. 6B and FIG. 7, see FIG. 10). In this example, the moving starting position is a position on the rear side of the nozzle surface N, and the moving end position is a position on the front side the nozzle surface N. The direction from the moving start position to the moving end position (in this embodiment, the direction from the rear to the front) is set to the moving direction X1 of the carriage 71. The carriage moving mechanism 87 is electrically connected to the control part 201 (see FIG. 10).

The blade 83 is a plate-like member having a width wider than the width of the nozzle surface N, and is made of flexible resin or the like. The blade 83 is inclined on the upstream side in the moving direction X1 and inclined in the blade width direction X2 (the left-and-right directions) intersecting the moving direction X1, and the lower end portion is supported by the holder 85. The lower end portion of the holder 85 is turnably supported by the moving body 81 around a turning shaft 89 (see FIG. 6A and FIG. 6B) on the upstream side of the blade 83 in the moving direction X1. As a result, the blade 83 can be turned to the upstream side and the downstream side of the moving direction X1 together with the holder 85 around the turning shaft 89. The holder 85 has a pair of arms 85*a* extending upward from both side portions in the blade width direction X2.

Next, the cleaning liquid supply member 73 will be described. The cleaning liquid supply member 73 is provided separately from the carriage 71, and has a cleaning liquid storage member 91 and a pair of holders 93 that supports the cleaning liquid storage member 91 and is supported by the rail 79.

The cleaning liquid storage member 91 is a rectangular plate-like member, and has a flat upper surface. On the lower surface of the cleaning liquid storage member 91, a recess 91*a* is formed along the blade width direction X2. The side surface of the recess 91*a* on the downstream side of the moving direction X1 is inclined toward the downstream side of the moving direction X1. The cleaning liquid storage member 91 has a front end portion 91*b* on the downstream side of the recess 91*a* in the moving direction X1 and a base end portion 91*c* on the upstream side of the recess 91*a* in the moving direction X1. The front end portion 91*b* is formed to be thinner than the base end portion 91*c*. The lower surface of the front end portion 91*b* is formed in a planar shape inclined slightly upward toward the downstream side of the moving direction X1.

On the upper surface of the front end portion 91*b*, one supplied port 95 is formed. On the lower surface of the front end portion 91*b*, a plurality of supply ports 97 are formed. The front end portion 91*b* is provided with a hollow space for storing the cleaning liquid. The hollow space communicates with the supplied port 95 and the supply ports 97.

On the lower surface of the front end portion 91*b*, a rectangular sheet member 99 protruding to the downstream side in the moving direction X1 is attached. The sheet member 99 extends to the downstream side of the moving direction X1 (forward) along the substantially same surface as the lower surface of the front end portion 91*b*. The sheet member 99 has a plurality of through-holes 101 communicating with the supply ports 97 of the front end portion 91*b*.

Each of the pair of holders 93 is an L-shaped plate-like member viewed from the lateral side. A support shaft 103 is provided at one end portion of the holder 93. The support shaft 103 is housed in a recess 79*a* provided in the rail 79 on the upstream side of the moving start position of the carriage 71 in the moving direction X1. On the other end portion of the holder 93, the base end portion 91*c* of the cleaning liquid storage member 91 is turnably supported around a turning shaft 105. As a result, the cleaning liquid storage member 91 can be turned around the turning shaft 105 in an inclined posture (see FIG. 6A) in which the upper surface is inclined upward toward the downstream side (forward) of the moving direction X1, and a supply posture (see FIG. 6B and FIG. 7) in which the upper surface is along the horizontal direction. As the cleaning liquid storage member 91 is turned in the above manner, the sheet member 99 is also turned into an inclined posture inclined upward toward the downstream side of the moving direction X1 (see FIG. 6A) and a supply posture extending toward the downstream side of the moving direction X1 (see FIG. 6B and FIG. 7). A torsional coil spring (not shown) is fitted around the turning shaft 105. The torsional coil spring biases the cleaning liquid storage member 91 to the inclined posture.

Figure 8A:
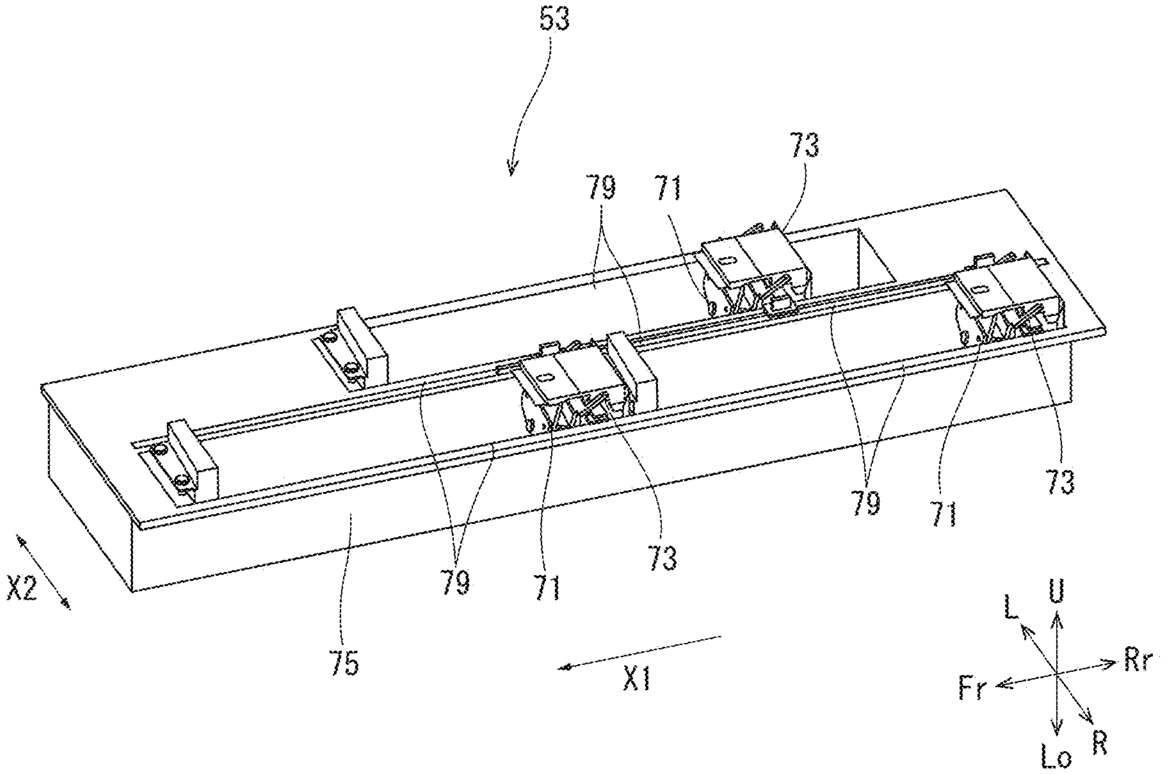
FIG. 8A is a perspective view showing the carriages move to a moving start position, in the wipe unit of the inkjet recording apparatus according to the embodiment of the present disclosure.
Figure 8B:
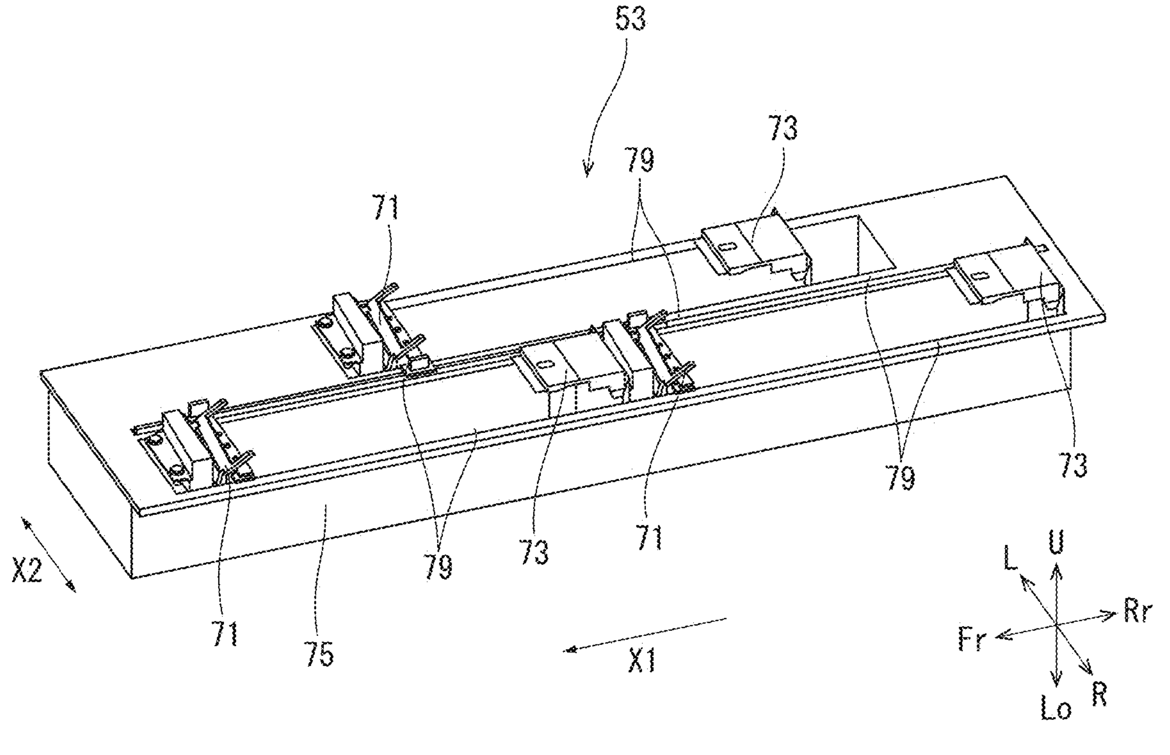
FIG. 8B is a perspective view showing the carriages move to a moving end position, in the wipe unit of the inkjet recording apparatus according to the embodiment of the present disclosure.

Next, the movement of the carriage 71 will be described with reference to FIG. 8A and FIG. 8B. FIG. 8A shows the carriage 71 moved to the moving start position, and FIG. 8B shows the carriage 71 moved to the moving end position. FIG. 8A and FIG. 8B show a state in which the cleaning liquid storage member 91 is turned to the supply posture.

When the carriage 71 is moved to the moving start position (see FIG. 8A), the tip of the blade 83 is accommodated in the recess 91*a* of the cleaning liquid storage member 91 (see FIG. 6A, FIG. 6B and FIG. 7). The carriage 71 is moved from the moving start position (see FIG. 8A) to the moving end position (see FIG. 8B) by a carriage moving mechanism 87 (see FIG. 10). Since the cleaning liquid supply member 73 is immovably supported by the rail 79 of the waste liquid tray 75 as described above, the cleaning liquid supply member 73 does not move even if the carriage 71 is moved.

Next, the movement of the wipe unit 53 will be described. The wipe unit 53 (the carriages 71, the cleaning liquid supply members 73, and the waste liquid tray 75) can be moved between a standby position (see FIG. 2B) and a wiping position by a wipe unit moving mechanism 109 (see FIG. 10) in the conveying direction and in the opposite direction (the left-and-right direction). The standby position is a position where the wipe unit 53 is accommodated in the upper space of the housing 57. The wipe position is a position where the wipe unit 53 is accommodated in the space below the head unit 11 lifted to the retracted position. After the head unit 11 is moved to the retracted position, the wipe unit 53 is moved to the wiping position, and the head unit 11 is lowered to a predetermined height so that the blade 83 can be in contact with the nozzle surface N of the recording head 37. The wipe unit 53 is movable between the standby position and the wiping position through the right opened surface of the housing 57. The wipe unit moving mechanism 109 is electrically connected to the control part 201 (see FIG. 10).

Figure 9:
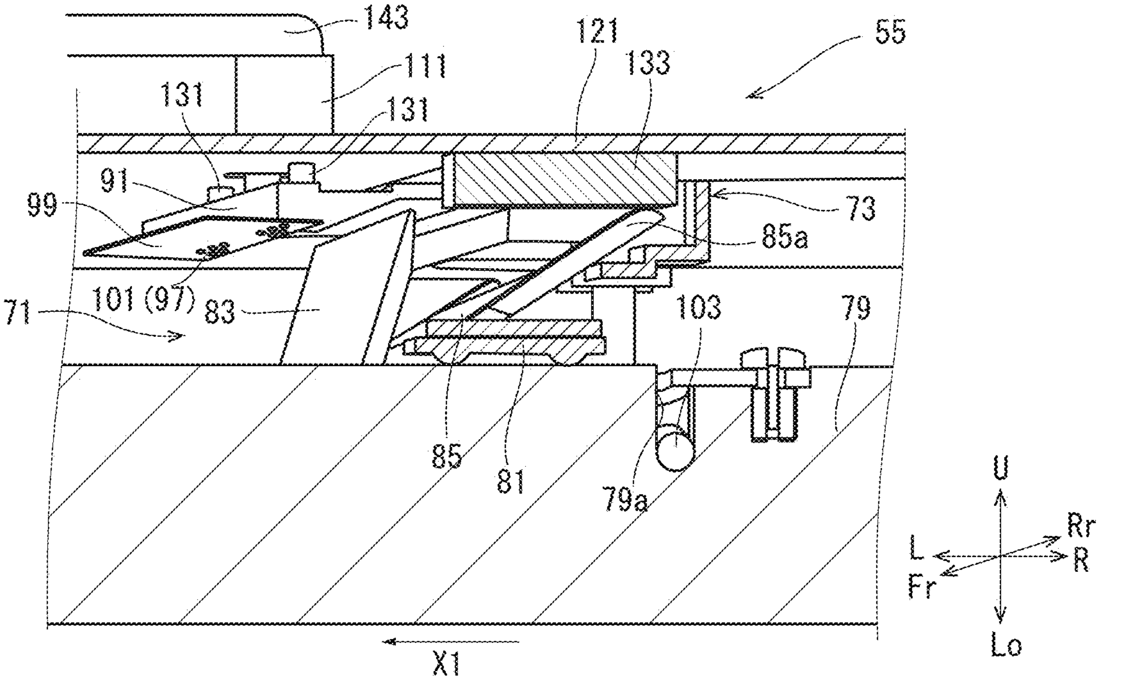
FIG. 9 is a perspective view showing a cleaning liquid supply part lowered to an insertion position, in the wipe unit of the inkjet recording apparatus according to the embodiment of the present disclosure.

Next, the cleaning liquid supply part 55 will be described with reference to FIG. 5 and FIG. 9. FIG. 9 is a sectional perspective view showing the cleaning liquid supply part 55 lowered to an insertion position.

The cleaning liquid supply part 55 is provided in the housing 57 (see FIG. 2B), and supplies the cleaning liquid to the three cleaning liquid supply members 73 of the wipe unit 53. As shown in FIG. 5, the cleaning liquid supply part 55 includes three supply pipes 111, a cleaning liquid tank 113, and a pump 115.

First, the three supply pipes 111 will be described. Each of the three supply pipes 111 is supported by a support plate 121 supported by the housing 57 in a posture along the upper-and-lower direction. The three supply pipes 111 are arranged so as to correspond to the supplied ports 95 of the three cleaning liquid supply members 73 of the wipe unit 53 moved to the standby position.

As shown in FIG. 9, on the lower surface of the support plate 121, a pair of positioning pins 131 are formed on both sides of each supply pipe 111 in the blade width direction X2. Further, on the lower surface of the support plate 121, a pair of rectangular parallelepiped protrusions 133 separated in the blade width direction X2 are formed on the upstream side of the supply pipe 111 in the moving direction X1.

The support plate 121 is supported by a lifting mechanism 135 (see FIG. 10) so as to be lifted and lowered to a plurality of positions including a separated position and an insertion position. In the separated position, the support plate 121 is separated upward from the wipe unit 53 moved to the standby position. In the supply position, as shown in FIG. 9, the tips of the three supply pipes 111 are inserted into the supplied ports 95 of the three cleaning liquid supply members 73 of the wipe unit 53 moved to the standby position.

More specifically, when the support plate 121 is lowered from the separated position, the lower surface of the support plate 121 abuts against the tip of the sheet member 99 of the cleaning liquid storage member 91. When the support plate 121 is further lowered, the sheet member 99 and the cleaning liquid storage member 91 are pushed downward by the lower surface of the support plate 121, and begin to be turned from the inclined posture to the supply posture. When the support plate 121 is lowered to the supply position, as shown in FIG. 9, the positioning pins 131 abut on the upper surface of the front end portion 91*b* of the cleaning liquid storage member 91. As a result, the tips of the three supply pipes 111 are inserted into the supplied ports 95 of the three cleaning liquid storage members 91, and the cleaning liquid storage members 91 are turned to the supply posture. Further, the protrusions 133 push down the arms 85*a* of the holder 85 of the carriage 71. As a result, the holder 85 is turned with respect to the moving body 81, and the blade 83 is inclined to the upstream side of the moving direction X1.

Next, the cleaning liquid tank 113 will be described with reference to FIG. 5. The cleaning liquid is stored in the cleaning liquid tank 113. The cleaning liquid is, for example, a liquid consisting mainly of a solvent and water, in which the color material is removed from the ink. Surfactant, preservative or the like may be added as necessary. A pipe 141 is connected to the outlet port of the cleaning liquid tank 113. The pipe 141 branches into three branch pipes 143 through a joint. The three branch pipes 143 are connected to the three supply pipes 111. The cleaning liquid tank 113 is an example of a cleaning liquid supply source in the present disclosure.

Next, the pump 115 will be described with reference to FIG. 5. The pump 115 is provided in the pipe 141 to pump the cleaning liquid from the cleaning liquid tank 113 to the pipe 141.

Figure 10:
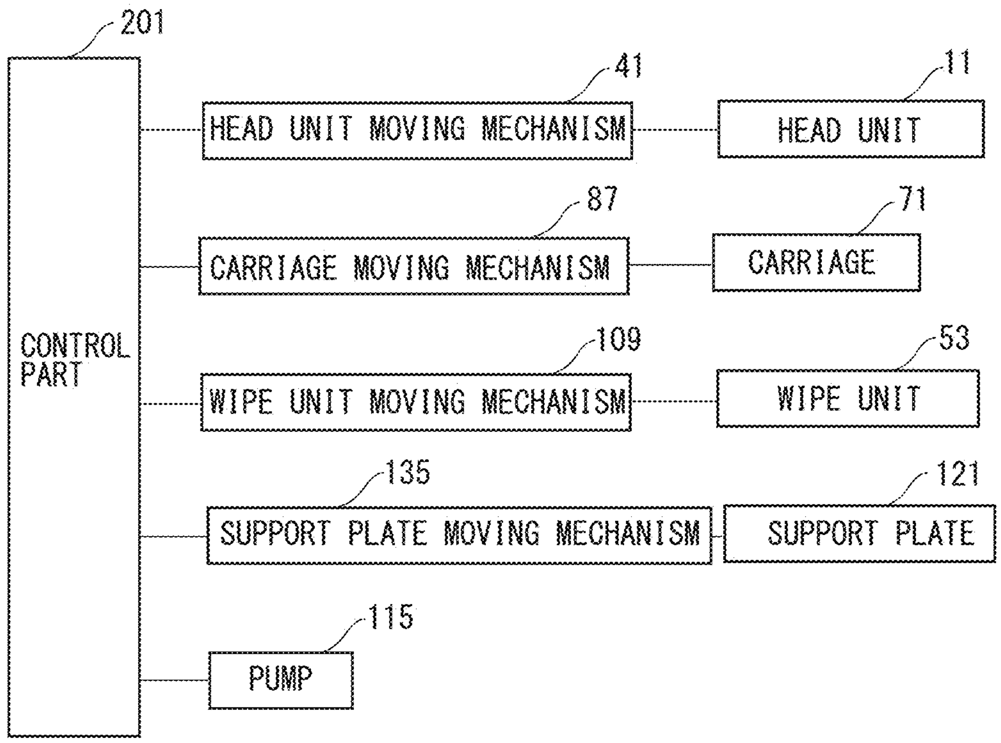
FIG. 10 is a block diagram showing a control part in the inkjet recording apparatus according to the embodiment of the present disclosure.

Next, the control part 201 will be described with reference to FIG. 10. FIG. 10 is a block diagram showing the control part 201. The control part 201 operates the head unit lifting mechanism 41 to lift and lower the head unit 11 to a plurality of positions including the printing position, the retracted position, and a cleaning position between the printing position and the retracted position. The control part 201 operates the carriage moving mechanism 87 to move the carriage 71 between the moving start position and the moving end position. The control part 201 operates the wipe unit moving mechanism 109 to move the wipe unit 53 between the wiping position and the separated position. The control part 201 operates the support plate lifting mechanism 135 to lift and lower the support plate 121 to the separated position and the insertion position. Further, the control part 201 operates the pump 115 to start and stop pumping of the cleaning liquid from the cleaning liquid tank 113 to the pipe 141.

Next, the printing operation and the head cleaning operation of the inkjet recording apparatus 1 having the above configuration will be described with reference to FIG. 1 and the others.

First, the printing operation will be described with reference to FIG. 1. In the printing operation, the head unit 11 is lowered to the printing position, and the cap unit 51 and the wipe unit 53 are moved to the standby position. The support plate 121 is lowered to the insertion position, and the three supply pipes 111 of the cleaning liquid supply part 55 are inserted into the supplied ports 95 of the three cleaning liquid storage members 91. The cleaning liquid storage member 91 is turned to the supply posture.

First, the sheet is fed from the sheet feeding cassette 5 by the sheet feeding roller 7. The fed sheet is conveyed to the conveying unit 9 along the conveyance path 19 by the conveying rollers pair 21. The sheet is conveyed along the upper track of the conveying belt 25 of the conveying unit 9. At this time, the ink is ejected onto the sheet from the recording head 37 of the head unit 11 corresponding to image data, and an image is formed on the sheet. Thereafter, the sheet is conveyed along the conveyance path 19 by the conveying rollers pair 21, and discharged to the discharge tray 17 by the discharge rollers pair 15.

In this way, the head unit 11 is moved to the printing position during the printing operation. Each recording head 37 of the head unit 11 is not provided with a structure for supplying the cleaning liquid. Therefore, a defect such that the cleaning liquid accidentally comes into contact with the sheet does not occur.

After the printing operation is completed, the wiping operation is performed at a predetermined timing (the description of the capping operation is omitted). As described above, the wipe unit 53 is moved to the standby position. The three supply pipes 111 are inserted into the supplied ports 95 of the three cleaning liquid supply members 73 of the wipe unit 53.

First, the control part 201 controls the head unit lifting mechanism 41 to lift the head unit 11 to the retracted position.

Thereafter, the control part 201 controls the pump 115 to pump the cleaning liquid from the cleaning liquid tank 113 to the pipe 141. The cleaning liquid is sent to the three supply pipes 111 through the pipe 141 and the three branch pipes 143. Then, it is supplied from the three supply pipes 111 to the hollow spaces of the three cleaning liquid supply members 73 through the supplied ports 95 of and then stored. The control part 201 drives the pump 115 so as to pump the cleaning liquid until the supplied cleaning liquid is held in a protruded state in a hemispherical shape from the supply ports 97 (the through-holes 101 of the sheet member 99), and then stops the driving the pump 115. Note that, except for the head cleaning operation, the cleaning liquid is held inside the supply port 97 by forming a concave meniscus.

Thereafter, the control part 201 controls the support plate lifting mechanism 135 to lift the support plate 121 from the insertion position to the separated position. Then, the support plate 121 is separated from the cleaning liquid storage members 91, and the cleaning liquid storage member 91 is biased by the torsion coil spring to be turned from the supply posture to the inclined posture. The torsion coil spring has a biasing force such that the cleaning liquid held in the supply ports 97 does not fall.

Thereafter, the control part 201 controls the wipe unit moving mechanism 109 to move the wipe unit 53 (the carriages 71, the cleaning liquid supply members 73, the waste liquid tray 75) from the standby position to the wiping position. At this time, the cleaning liquid supply members 73 are moved while the cleaning liquid protrudes from the supply ports 97 in a hemispherical shape. Thereafter, the control part 201 controls the head unit lifting mechanism 41 to lower the head unit 11 to the cleaning position.

Figure 11A:
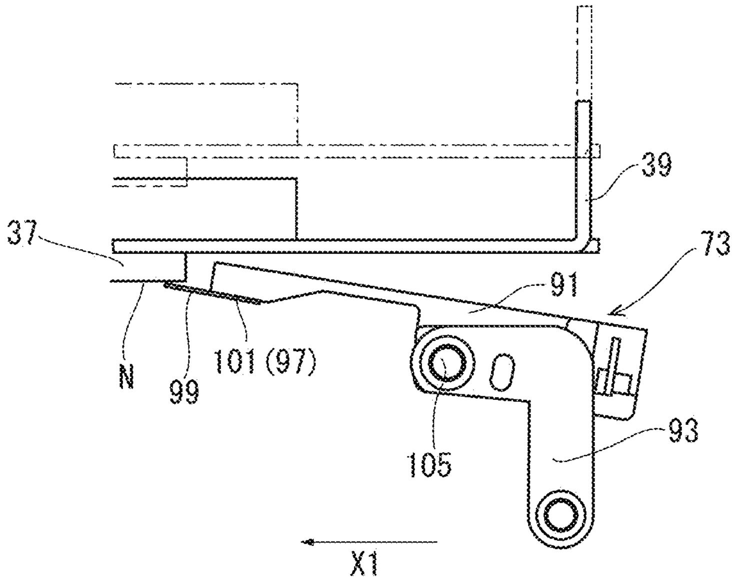
FIG. 11A is a side view showing the cleaning liquid storage member (in a state where a tip of a sheet member comes into contact with a nozzle surface of a recording head), in the inkjet recording apparatus according to the embodiment of the present disclosure.
Figure 11B:
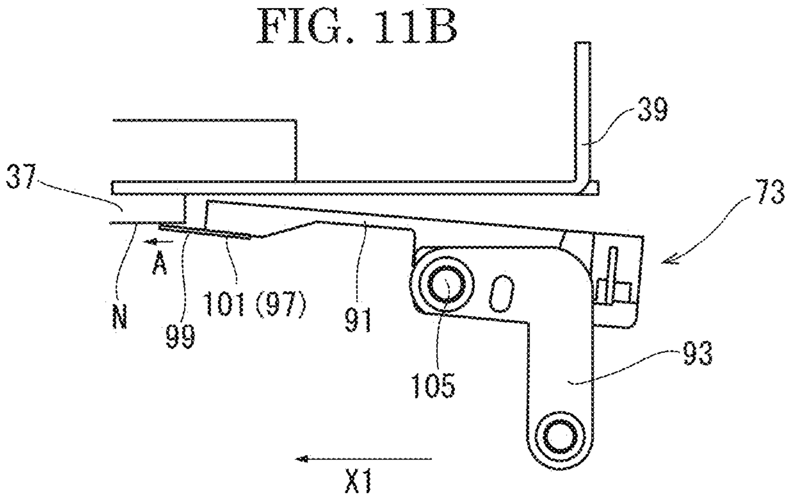
FIG. 11B is a side view showing the cleaning liquid storage member (in a state where the tip of the sheet member is moving along the nozzle surface of the recording head), in the inkjet recording apparatus according to the embodiment of the present disclosure.
Figure 11C:
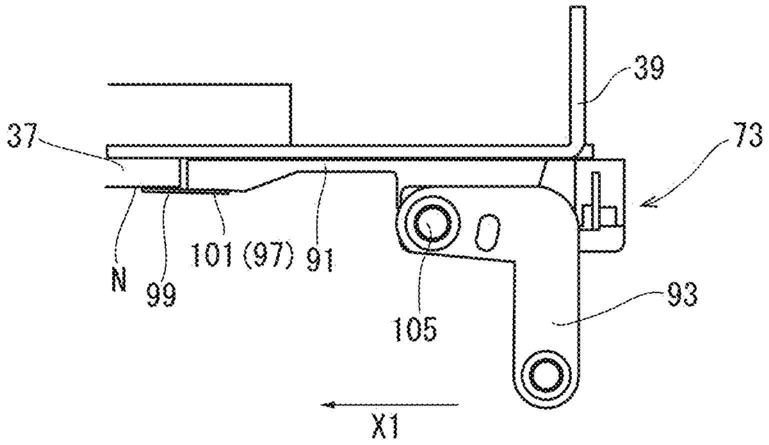
FIG. 11C is a side view showing the cleaning liquid storage member (in a state where the sheet member is turned to a supply posture), in the inkjet recording apparatus according to the embodiment of the present disclosure.

The operation of the cleaning liquid storage member 91 when the head unit 11 is lowered will be described with reference to FIG. 11A to FIG. 11C. FIG. 11A to FIG. 11C are side views showing the cleaning liquid storage member 91. First, as shown in FIG. 11A, the tip end of the sheet member 99 of the cleaning liquid storage member 91 abuts against the nozzle surface N of the recording head 37. As shown in FIG. 11B, with the lowering of the recording head 37, while the tip end of the sheet member 99 moves forward in the moving direction X1 along the nozzle surface N (see the arrow A in FIG. 11B), the cleaning liquid storage member 91 starts to be turned from the inclined posture to the supply posture. This operation of the sheet member 99 causes the nozzle surface N to be rubbed by the sheet member 99. As a result, the cleaning liquid and the ink attached to the nozzle surface N are wiped off by the sheet member 99.

The control part 201 stops the lowering of the wipe unit 53 when the cleaning liquid storage member 91 is turned to the supply posture. Then, as shown in FIG. 11C, the lower surface of the front end portion 91*b* of the cleaning liquid storage member 91 is disposed on the substantially same surface as the nozzle surface N of the recording head 37, and the gap between the lower surface of the front end portion 91*b* of the cleaning liquid storage member 91 and the nozzle surface N of the recording head 37 is closed by the sheet member 99.

Thereafter, the control part 201 controls the carriage moving mechanism 87 to move the carriage 71 from the moving start position to the moving end position. Thus, the blade 83 passes through the supply ports 97 of the cleaning liquid storage member 91 and moves to the nozzle surface N via the sheet member 99. Then, the wiping operation in which the blade 83 is moved along the nozzle surface N is performed. By this wiping operation, the ink remaining on the nozzle surface N is wiped off by the blade 83 together with the cleaning liquid held in the supply ports 97. The wiped ink and the cleaning liquid fall from the lower edge and the side edge of the blade 83 to the waste liquid tray 75 below.

Thereafter, the control part 201 controls the head unit lifting mechanism 41 to lift the head unit 11 to the standby position. As a result, the cleaning liquid storage member 91 is turned from the supply posture to the inclined posture. Thereafter, the control part 201 controls the carriage moving mechanism 87 to move the carriage 71 to the moving start position. Thereafter, the control part 201 controls the wipe unit moving mechanism 109 to move the wipe unit 53 from the wiping position to the standby position. Further, the control part 201 controls the support plate lifting mechanism 135 to lower the support plate 121 from the separated position to the supply position. Thus, the three supply pipes 111 are inserted into the supplied ports 95 of the three cleaning liquid supply members 73 of the wipe unit 53.

As described above, according to the present disclosure, the wipe unit 53 is provided with the carriages 71 and the cleaning liquid supply members 73, and is moved to the separated position during the printing operation. That is, since the head unit 11 is not provided with a mechanism for supplying the cleaning liquid, the cleaning liquid does not adhere to the sheet or the sheet does not come into contact with the mechanism for supplying the cleaning liquid even when the sheet is erroneously bent upward during the printing operation. Therefore, the contamination of the sheet with the cleaning liquid and the damage to the mechanism for supplying the cleaning liquid by the sheet can be prevented.

As the cleaning liquid storage member 91 is turned from the inclined posture to the supply posture when the recording head 37 is lowered to the printing position, the tip end of the sheet member 99 rubs the nozzle surface N. Thus, when the cleaning liquid remains on the nozzle surface N, the cleaning liquid and the ink can be rubbed off with the sheet member 99.

Further, when the cleaning liquid storage member 91 is turned to the supply posture, the lower surface of the front end portion 91*b* of the cleaning liquid storage member 91 and the nozzle surface N of the recording head 37 are closed by the sheet member 99, so that the cleaning liquid can be surely transported from the supply ports 97 to the nozzle surface N by the blade 83. Further, since the cleaning liquid storage member 91 is biased to the inclined posture by the torsion coil spring, the sheet member 99 comes into contact with the nozzle surface N at a predetermined pressure. Therefore, the sheet member 99 can be surely brought into contact with the nozzle surface N. Note that the cleaning liquid storage member 91 may be configured to be turned to the inclined posture by its own weight.

Further, the supply pipes 111 of the cleaning liquid supply part 55 for supplying the cleaning liquid to the cleaning liquid storage members 91 only move in the upper-and-lower direction together with the support plate 121, but does not move in the left-and-right direction. Since the moving distance of the supply pipes 111 is relatively short in this manner, it is possible to prevent the pipe 141 and the branch pipes 143 connected to the supply pipes 111 from being bent to cause a supply failure. Further, the pipe 141 and the branch pipes 143 can be drawn in a narrow space.

The present disclosure also includes a case where the sheet member 99 is attached to the lower surface of the cleaning liquid storage member 91 so as to overlap the supply ports 97, and the through-holes 101 communicating with the supply ports 97 are formed in the sheet member 99, as in the present embodiment. That is, in a state where the cleaning liquid supply member 73 is moved to the supply position, a part of the sheet member 99 may be provided in front of the supply ports 97 in the moving direction X1. The sheet member 99 may be attached in front of the supply ports 97 of the cleaning liquid storage member 91 in the moving direction X1.

In this embodiment, an example in which the four head units 11 are provided for the colors of ink and the maintenance unit 13 is provided for each head unit 11 is described. However, the four head units 11 may be integrally provided, and the maintenance unit 13 may be configured so that the four cap units 51 and the four wipe units 53 are integrally provided.

Although the present disclosure has been described in particular embodiments, the present disclosure is not limited to the foregoing embodiments. A person skilled in the art may modify the above embodiments, so long as they do not deviate from the scope and object of the present disclosure.

The invention claimed is:

1. An inkjet recording apparatus comprising:

a head unit provided with a nozzle surface on which a plurality of ink ejection ports is opened downward and supported to be lifted and lowered;

a blade movable along a predetermined moving direction in contact with the nozzle surface to wipe the nozzle surface; and a cleaning liquid supply member movable between a separated position and supply position, in the separated position, the cleaning liquid supply member being separated from the nozzle surface and capable of being supplied with cleaning liquid, and in the supply position, the cleaning liquid supply member being capable of supplying the cleaning liquid to between the nozzle surface and a moving start position of the blade, wherein the cleaning liquid supply member includes:

a supply port in which the supplied cleaning liquid is held;

a sheet member provided on a front side of the supply port in the moving direction; and a holder which supports the sheet member so as to be turned from an inclined posture inclined upward toward the front side in the moving direction to a supply posture extending toward the front side in the moving direction, and when the cleaning liquid supply member is moved to the supply position and then the recording head is lowered, a tip end of the sheet member comes into contact with the nozzle surface, and then the cleaning liquid supply member is turned from the inclined posture to the supply posture while the tip end of the sheet member is moved along the nozzle surface forward in the moving direction, and the sheet member is disposed between the supply port and the nozzle surface.

2. The inkjet recording apparatus according to claim 1, comprising:

a wipe unit including the blade and the cleaning liquid supply member.

3. The inkjet recording apparatus according to claim 1, wherein the cleaning liquid supply member is tuned by a biasing member or its own weight.

* * * * *